United States Patent
Kuo et al.

(10) Patent No.: US 11,514,617 B2
(45) Date of Patent: Nov. 29, 2022

(54) METHOD AND SYSTEM OF PROVIDING VIRTUAL ENVIRONMENT DURING MOVEMENT AND RELATED NON-TRANSITORY COMPUTER-READABLE STORAGE MEDIUM

(71) Applicant: HTC Corporation, Taoyuan (TW)

(72) Inventors: Shih-Chieh Kuo, Taoyuan (TW); Yuan-Tung Chen, Taoyuan (TW); Wan-Ling Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/444,997

(22) Filed: Aug. 13, 2021

(65) Prior Publication Data

US 2022/0051449 A1 Feb. 17, 2022

Related U.S. Application Data

(60) Provisional application No. 63/065,504, filed on Aug. 14, 2020.

(51) Int. Cl.
*G06T 11/00* (2006.01)
*G06T 7/70* (2017.01)
(Continued)

(52) U.S. Cl.
CPC ............... *G06T 11/00* (2013.01); *G06K 9/628* (2013.01); *G06T 7/269* (2017.01); *G06T 7/50* (2017.01);
(Continued)

(58) Field of Classification Search
CPC . G06T 11/00; G06T 7/269; G06T 7/50; G06T 7/70; G06T 2207/30252;
(Continued)

(56) References Cited

U.S. PATENT DOCUMENTS

| | | | |
|---|---|---|---|
| 2018/0307914 A1* | 10/2018 | Moon | G06T 19/006 |
| 2019/0180717 A1* | 6/2019 | Haar | G02B 27/017 |
| 2019/0384383 A1* | 12/2019 | Lee | G06F 3/011 |

FOREIGN PATENT DOCUMENTS

| | | |
|---|---|---|
| TW | 201523332 A | 6/2015 |
| TW | I595446 B | 8/2017 |

(Continued)

*Primary Examiner* — Jeffery A Brier
(74) *Attorney, Agent, or Firm* — CKC & Partners Co., LLC

(57) ABSTRACT

A method for providing a virtual environment during movement is provided. The method includes the following operations: capturing a first image associated with an interior space of a housing and also associated with part of an external environment captured outward from the interior space; classifying the first image into a first segment associated with the interior space and a second segment associated with the part of the external environment; estimating a first pose and a second pose of a mobile device associated with respective the housing and the external environment, in which the first pose is estimated by a first localization model based on the first segment, and the second pose is estimated by a second localization model based on a second image associated with the external environment; and displaying virtual objects by the mobile device according to the first and second poses.

20 Claims, 8 Drawing Sheets

(51) Int. Cl.
*G06T 7/50* (2017.01)
*G06K 9/62* (2022.01)
*G06T 7/269* (2017.01)

(52) U.S. Cl.
CPC ...... *G06T 7/70* (2017.01); *G06T 2207/30252* (2013.01); *G06T 2207/30268* (2013.01)

(58) Field of Classification Search
CPC . G06T 2207/30268; G06T 2207/10021; G06T 7/11; G06T 7/194; G06T 2207/10028; G06T 19/006; G06T 2207/30248; G06T 2207/30256; G06T 2207/30261; G06T 2207/30264; G06V 20/20; G06V 20/56; G06V 20/58; G06V 20/582; G06V 20/584; G06V 20/586; G06V 20/588; G06V 20/59; G06F 3/011; G06F 3/14; G06K 9/628
See application file for complete search history.

(56) References Cited

FOREIGN PATENT DOCUMENTS

| TW | I603287 B | 10/2017 |
|---|---|---|
| TW | I618030 B | 3/2018 |
| TW | 201823983 A | 7/2018 |
| TW | I672168 B | 9/2019 |
| TW | 202004670 A | 1/2020 |

\* cited by examiner

METHOD AND SYSTEM OF PROVIDING VIRTUAL ENVIRONMENT DURING MOVEMENT AND RELATED NON-TRANSITORY COMPUTER-READABLE STORAGE MEDIUM

RELATED APPLICATIONS

This application claims priority to U.S. Provisional Application Ser. No. 63/065,504, filed Aug. 14, 2020, which is herein incorporated by reference in its entirety.

BACKGROUND

Technical Field

The present disclosure relates to a method, system and non-transitory computer-readable storage media. More particularly, the present disclosure relates to a method and system for providing virtual environment during movement and a related non-transitory computer-readable storage medium.

Description of Related Art

In the automotive field, augmented reality (AR) technology is originally designed to display information related to the vehicle itself, such as speed and direction. Being actively developed by automotive industries, AR technology can now further realize driving assistance functions such as navigation and lane departure warning. In order to keep virtual objects in correct positions in the real-world environment whenever the user views the virtual objects, the head-mounted device (HMD) or other device that can provide the virtual objects need to locate a position and field of view of the user in real time. The real-time positioning technologies include, for example, the inside out tracking technique and the outside in tracking technique. The outside in tracking technique requires multiple fixed lighthouses, and uses optical tracking technique to locate the position of the user. High accuracy and utilizing simple algorithm are advantages of the outside in tracking technique, the fixed lighthouses, however, not applicable to vehicles that are often in a moving status. The inside out tracking technique requires image processing algorithms that are complex, but this tracking technique allows the HMD to perform self-positioning through capturing images of the surrounding environment. However, when the inside out tracking technique is implemented in the in-vehicle applications, real-world objects inside and outside the vehicle that move at different speeds disturb the positioning process of the inside out tracking technique, causing the HMD hard to display virtual objects at correct positions that are inside and outside the vehicle simultaneously.

SUMMARY

The disclosure provides a method for providing a virtual environment during movement. The method includes the following operations: capturing a first image associated with an interior space of an at least partially enclosed housing and also associated with part of an external environment of the housing captured outward from the interior space; classifying the first image into a first segment associated with the interior space and a second segment associated with the part of the external environment captured from the interior space; estimating a first pose and a second pose of a mobile device associated with respective the housing and the external environment, in which the first pose is estimated by a first localization model based on the first segment, and the second pose is estimated by a second localization model based on a second image associated with the external environment; and displaying a plurality of virtual objects in a field of view of the mobile device according to the first pose and the second pose.

The disclosure provides a system for providing a virtual environment during movement. The system includes a mobile device and a host device. The a mobile device is configured to capture a first image associated with an interior space of an at least partially enclosed housing and also associated with part of an external environment of the housing captured outward from the interior space. The host device is communicatively coupled with the mobile device, and is configured to: classify the first image into a first segment associated with the interior space and a second segment associated with the part of the external environment captured from the interior space; and estimate a first pose and a second pose of a mobile device associated with respective the housing and the external environment, in which the first pose is estimated by a first localization model based on the first segment, and the second pose is estimated by a second localization model based on a second image associated with the external environment. The mobile device is further configured to display a plurality of virtual objects in a field of view of the mobile device according to the first pose and the second pose.

The disclosure provides a non-transitory computer-readable storage medium storing a plurality of computer-readable instructions for controlling a system for providing a virtual environment during movement. The plurality of computer-readable instructions, when being executed by the system, causing the system to perform: capturing a first image associated with an interior space of an at least partially enclosed housing and also associated with part of an external environment of the housing captured outward from the interior space; classifying the first image into a first segment associated with the interior space and a second segment associated with the part of the external environment captured from the interior space; estimating a first pose and a second pose of a mobile device associated with respective the housing and the external environment, in which the first pose is estimated by a first localization model based on the first segment, and the second pose is estimated by a second localization model based on a second image associated with the external environment; and displaying a plurality of virtual objects in a field of view of the mobile device according to the first pose and the second pose.

It is to be understood that both the foregoing general description and the following detailed description are by examples, and are intended to provide further explanation of the disclosure as claimed.

DETAILED DESCRIPTION

Figure 1:
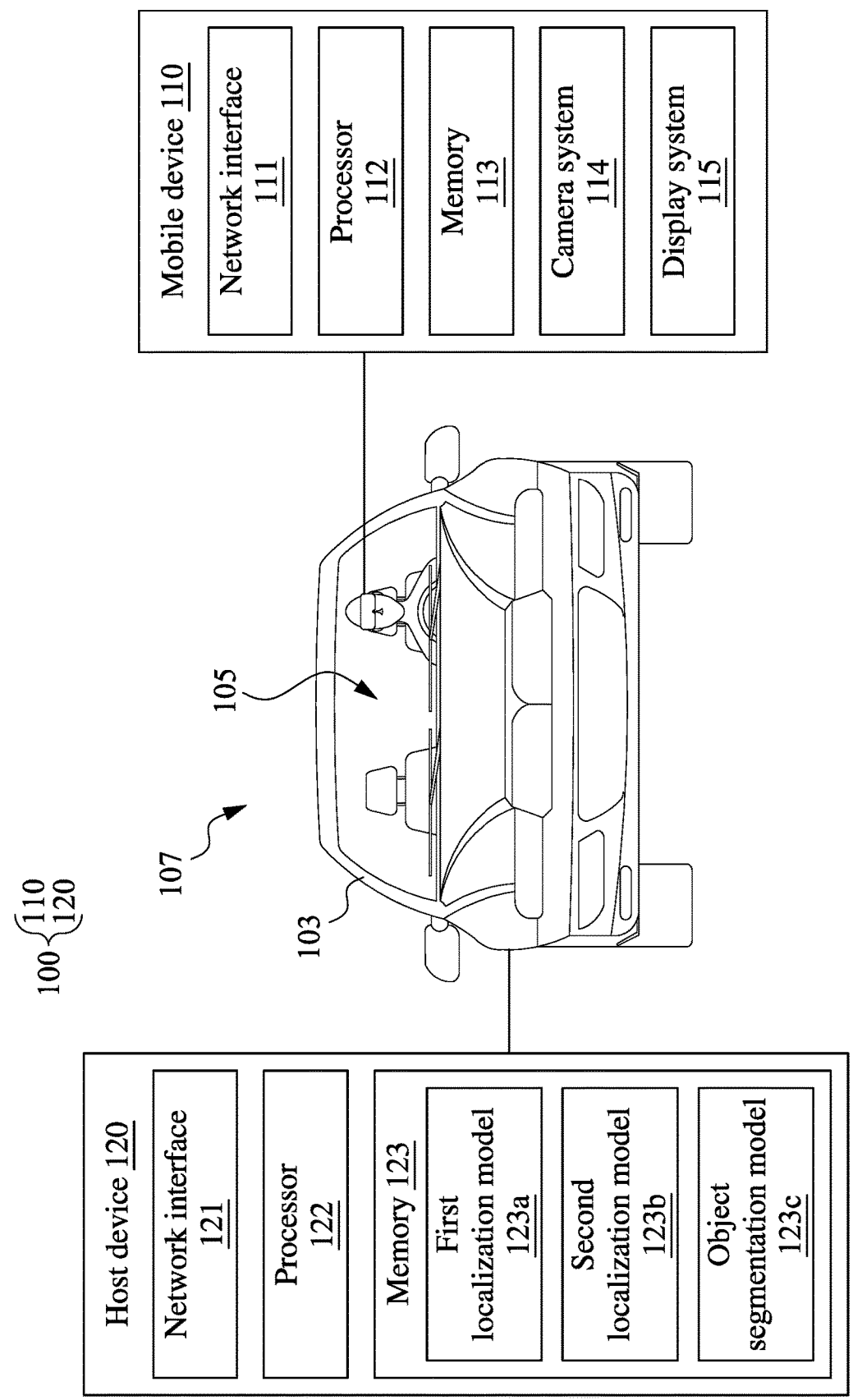
FIG. 1 is a diagram of a system configured to provide virtual environment during movement, according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a diagram of a system 100 configured to provide virtual environment during movement, according to one embodiment of the present disclosure. The system 100 comprises a mobile device 110 and a host device 120 that both have data processing ability. The mobile device 110 comprises a network interface 111 configured to communicate with the host device 120, a processor 112, a memory 113, a camera system 114 and a display system 115. In some embodiments, the mobile device 110 is a head mounted device (HMD) comprising an optical see-through system and/or a video see-through system for providing augmented reality (AR) environment. An optical see-through HMD worn by a user may allow actual direct viewing of a real-world environment (e.g., via transparent lenses) and may, at the same time, project images of a virtual object into the visual field of the user (e.g., by the display system 115) thereby augmenting the real-world environment perceived by the user with the virtual object. A video see-through HMD captures images of the real-world environment (e.g., by the camera system 114) and provide these images to the user (e.g., by the display system 115) to allow in-direct viewing of the real-world environment and may, at the same time, overlay images of the virtual objects onto the images of the real-world environment.

The host device 120 comprises a network interface 121 configured to communicate with the mobile device 110, a processor 122 and a memory 123. In some embodiments, the host device 120 may be implemented by an in-vehicle computer. The mobile device 110 and the host device 120 may store a plurality of computer-readable instructions in non-static computer-readable storage medium (e.g., the memories 113 and 123) which can be executed (e.g., by the processors 112 and 122) to perform operations steps discussed with reference to FIG. 2, but this disclosure is not limited thereto. In some embodiments, the host device 120 may be integrated in to the mobile device 110, that is, the mobile device 110 may be an all-in-one HMD that capable of performing all of the operation steps discussed with reference to FIG. 2.

The memory 123 of the host device 120 comprises a first localization model 123a, a second localization model 123b and an object segmentation model 123c. When the mobile device 110 is positioned in an interior space 105 of a housing 103 (e.g., a shell of a vehicle), the object segmentation model 123c is configured to segment images captured by the mobile device 110, and the first localization model 123a and a second localization model 123b are configured to generate poses of the mobile device 110 associated with respective the housing 103 and an external environment 107 of the housing 103, based on output of the object segmentation model 123c. Many models of object segmentation can be used in the present disclosure, and such models include, for example, R-CNN model, Fast R-CNN model, Faster R-CNN model, Mask R-CNN model, and YOLO model, among others. The pose associated with the housing 103 may include a six degree of freedom (6DOF) pose that can be described by using a coordinate system of the interior space 105. Similarly, the pose associated with the external environment 107 may include a 6DOF pose that can be described by using a coordinate system of the external environment 107. In some embodiments, the first localization model 123a and the second localization model 123b employ simultaneous localization and mapping (SLAM) techniques.

In some embodiments, each of the processors 112 and 122 may be realized by a single or multiple chip general purpose processor, an application specific integrated circuit (ASIC), field programmable gate array (FPGA) or combinations of multiple such devices. Each of the network interfaces 111 and 121 may include wireless network interfaces such as BLUETOOTH, WIFI, WIMAX, GPRS, or WCDMA; or wired network interfaces such as ETHERNET, USB, or IEEE-1364.

Figure 2:
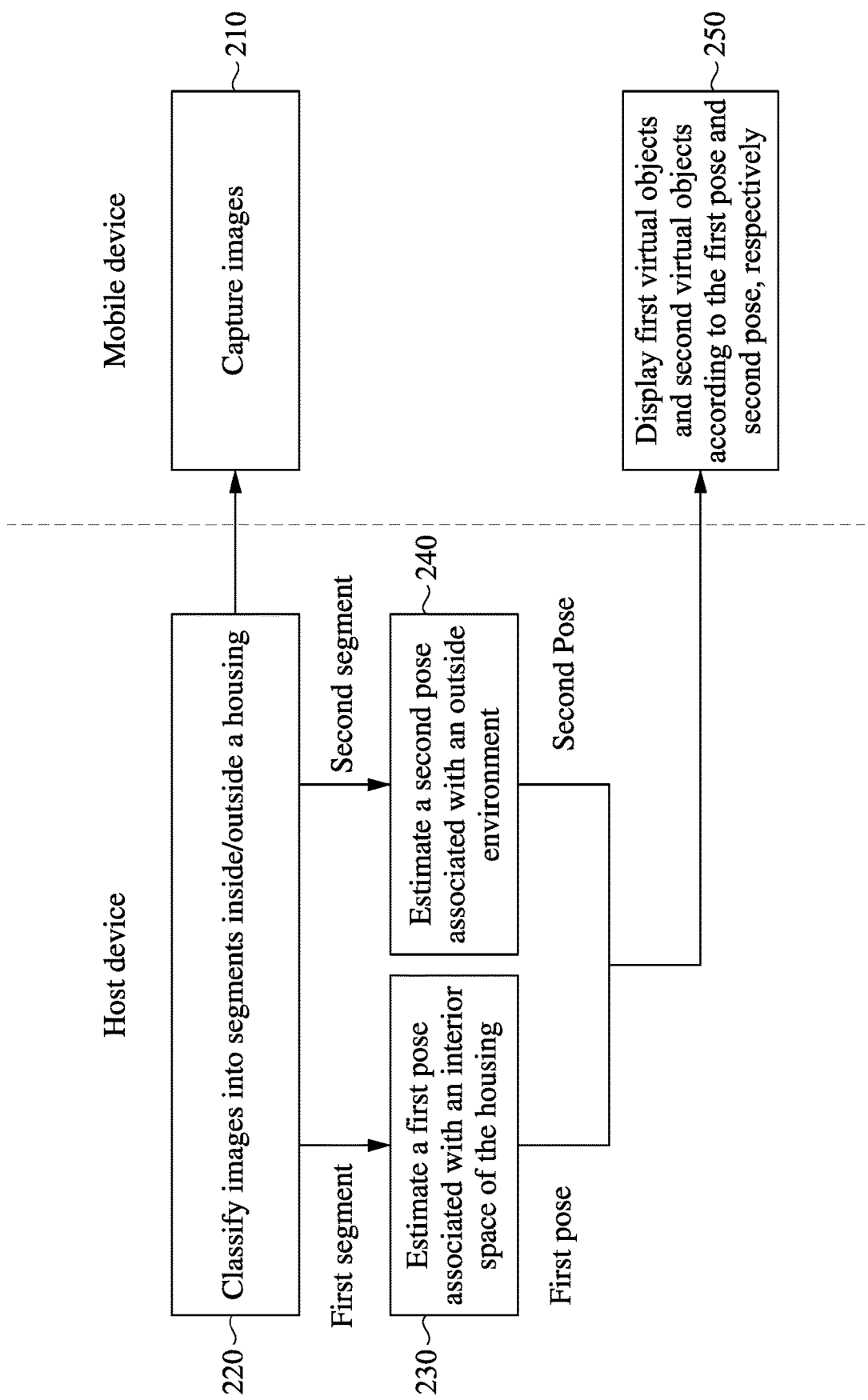
FIG. 2 is a flowchart for illustrating an operation conducted by the system of FIG. 1 for providing a virtual environment in the situation that a housing of FIG. 1 is moving, according to one embodiment of the present disclosure.

FIG. 2 is a flowchart for illustrating an operation conducted by the system 100 of FIG. 1 for providing a virtual environment in the situation that the housing 103 of FIG. 1 is moving (e.g., the user wearing the mobile device 110 is driving a vehicle), according to one embodiment of the present disclosure. For ease of understanding, the housing 103 is illustrated as a vehicle shell in the example embodiments of this disclosure. In step 210, the mobile device 110 captures a plurality of images (e.g., the images 300, 500 and 600 of FIGS. 3 and 5-6) through the camera system 114. Each image may comprise (i) portions associated with the interior space 105 including information of, for example, a steering wheel, air conditioner vents and the like, and (ii) portions associated with the external environment 107 including information of, for example, other vehicles, roadside trees and the like. On the other words, the portions associated with the external environment 107 include real-world objects that are captured outward from the interior space 105.

In step 220, the host device 120 receives the images captured by the mobile device 110. The object segmentation model 123c of the host device 120 conducts image segmentations to such images. For each image, the pixels will be classified into a subset corresponding to the interior space 105 and another subset corresponding to the external environment 107. Pixels of the subset corresponding to the interior space 105 are then segmented as a first segment which is input data of the first localization model 123a of FIG. 1. On the other hand, pixels of the subset corresponding to the external environment 107 are then segmented as a second segment which is input data of the second localization model 123b of FIG. 1. Methods for classifying the pixels are discussed with reference to FIGS. 3-6.

Figure 3:
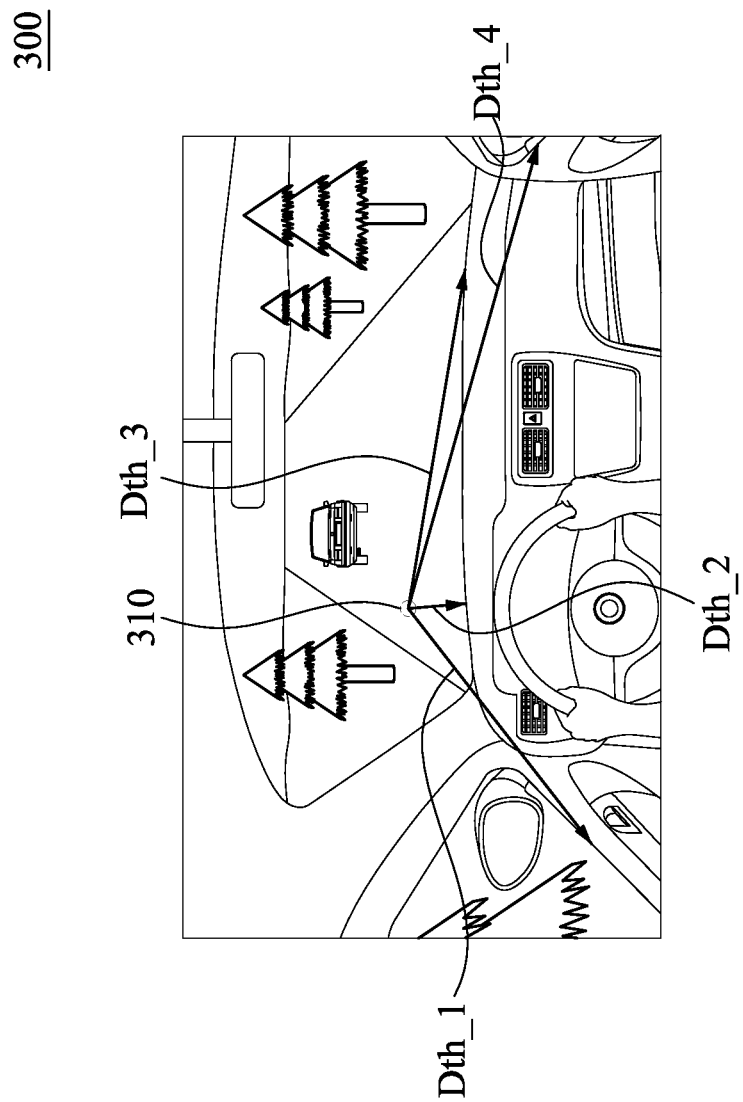
FIG. 3 depicts an image captured by a mobile device and used in the operation of FIG. 2, according to one embodiment of the present disclosure.

FIG. 3 depicts an image 300 captured by the mobile device 110 in step 210 and used for conducting step 220 of FIG. 2, according to one embodiment of the present disclosure. Among the classifying techniques that can be used in step 220, the first one is classifying the pixels by comparing depth values associated with the image 300 with a subset of depth threshold values (e.g., depth threshold values Dth_1-Dth_4) select from a plurality of depth threshold values. The host device 120 may obtain a map of the interior space 105, and select the subset of depth threshold values corresponding to respective portions of the map identified in the image 300. For example, a portion of the map corresponding to a door of the driver's seat may correspond to the smaller depth threshold value Dth_1; a portion of the map corresponding to the wind screen may correspond to the larger depth threshold values Dth_2 and Dth_3; and a portion of the map corresponding to a car door of the passenger's seat may correspond to the even larger depth threshold value Dth_4, in which a position 310 in FIG. 3 represents the position of the camera system 114 when capturing the image 300. Accordingly, by applying feature mapping to the map and the image 300 to search out the portions of the map that are present in the image 300, the host device 120 may select the subset of depth threshold values corresponding to the image 300 from the plurality of depth threshold values.

In some embodiment, the host device 120 may calculate the depth values associated with the image 300 through depth difference techniques. The camera system 114 of the mobile device 110 have multiple cameras, one of these cameras captures the image 300 while other cameras captures one or more auxiliary images at the time that the image 300 is captured. The depth values associated with the image 300 are then calculated according to disparity between the image 300 and the one or more auxiliary images. In other embodiments, the depth values associated with the image 300 may be measured by a depth sensor (not shown) at the time that the image 300 is captured. The depth sensor may be implemented in the mobile device 110 and have the same direction of viewing with the camera system 114. The depth sensor may be realized by a time of flight (ToF) camera, a structured light camera, an ultrasonic distance sensor, among others.

Figure 4B:
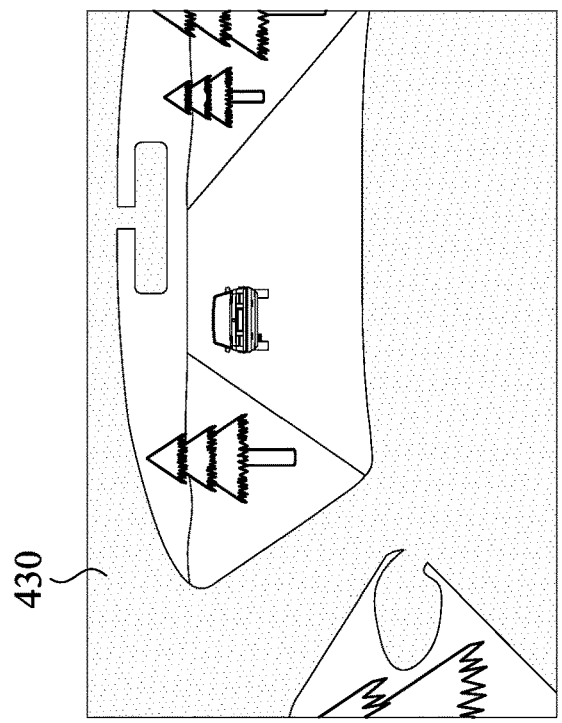
FIG. 4B is a schematic diagram of a second segment generated in step 210 of FIG. 2, according to one embodiment of the present disclosure.
Figure 4A:
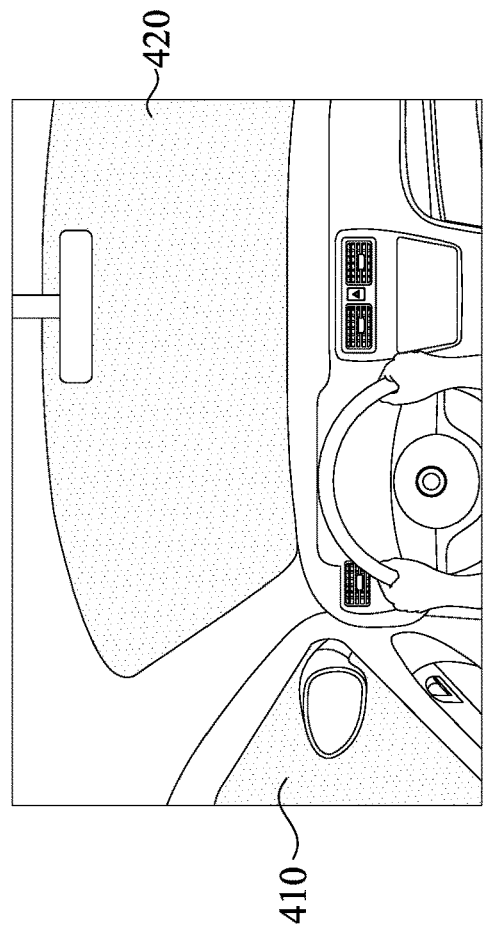
FIG. 4A is a schematic diagram of a first segment generated in step 210 of FIG. 2, according to one embodiment of the present disclosure.

Among pixels in the image 300 corresponding to each portion of the map (e.g., corresponding to the portion of the door of the driver's seat), the object segmentation model 123c classifies pixels corresponding to depth values smaller than or equal to a corresponding depth threshold value (e.g., the depth threshold value Dth_1) into the first segment associated with the interior space 105 thereby the first segment comprising objects of the interior space 105 (e.g., the steering wheel and air conditioner vents) is generated as shown in FIG. 4A. On the other hand, among pixels corresponding to such portion of the map, the object segmentation model 123c classifies pixels corresponding to depth values larger than the corresponding depth threshold value into the second segment associated with part of the external environment 107 captured outward from the interior space 105 (hereinafter referred to as the "captured external environment 107"), and thereby the second segment comprising objects of the captured external environment 107 (e.g., the other vehicle and street trees) is generated as shown in FIG. 4B. As shown in FIGS. 4A and 4B, in some embodiments, at regions 410, 420 and 430 that objects are filtered out pixels may be set to the 0 grayscale (depict as screentone) or being marked in other suitable means, so as to notify the first localization model 123a and the second localization model 123b that the regions 410, 420 and 430 are non-trackable.

The map of the interior space 105 may include a dense map comprising a dense three-dimensional (3D) surface mesh. In some embodiments, when the mobile device 110 is brought into the interior space 105 for the first time, the map may be generated by the mobile device 110 and/or the host device 120 through scanning the interior space 105 by using the camera system 114 and/or the depth sensor. Then, the mobile device 110 and/or the host device 120 may further generate the plurality of depth threshold values according to the newly generated map, in which generating the plurality of depth threshold values includes, for example, estimating distances between the position 310 of the camera system 114 and different portions of the map (e.g., the door and the wind screen); and setting these distances as the depth threshold values. In other embodiments, the map and the depth threshold values may be pre-loaded in the memory 113 and/or the memory 123 by the manufacturer of the housing 103 (e.g., a vehicle manufacturer).

In some embodiments, the object segmentation model 123c may compare the depth values associated with the image 300 with only one depth threshold value. Pixels in the image 300 corresponding to depth values smaller than or equal to such one depth threshold value are classified into the first segment. On the other hand, pixels in the image 300 corresponding to depth values larger than such one depth threshold value are classified into the second segment. In this case, the map of the interior space 105 can be omitted thereby computational complexity is reduced.

Figure 5:
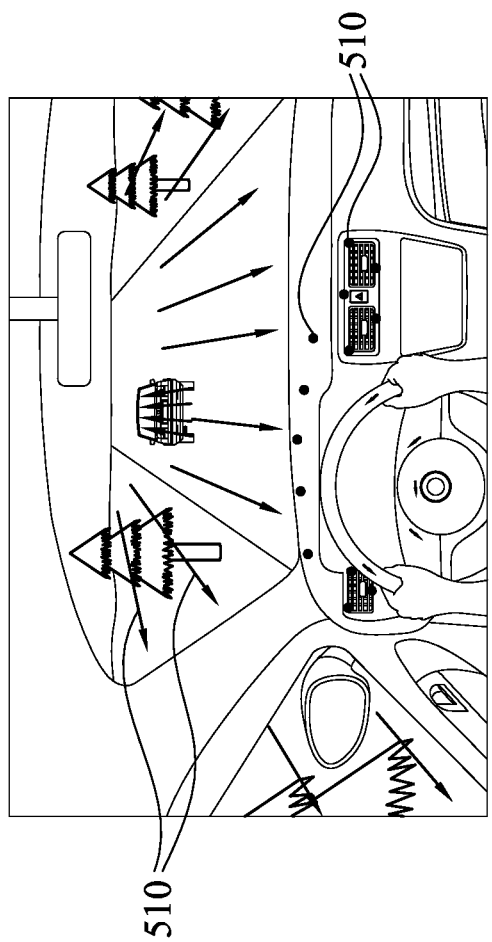
FIG. 5 depicts an image captured by the mobile device and used in the operation of FIG. 2, according to one embodiment of the present disclosure.

FIG. 5 depicts an image 500 captured by the mobile device 110 in step 210 and used for conducting step 220 of FIG. 2, according to one embodiment of the present disclosure. In this embodiment, the pixels in the image 500 are classified by the object segmentation model 123c into the first segment and the second segment associate with respective the interior space 105 and the captured external environment 107, by comparing magnitude of velocities associated with the image 500 with a velocity threshold value, in which such magnitude of velocity is calculated by optical flow techniques. Optical flow techniques are used to detect moving objects by calculating velocity or movement of individual pixels. Many techniques for analyzing optical flow can be used in the present disclosure, such techniques include, for example, phase correlation methods, block-based methods, differential methods such as the Lucas-Kanade optical flow method, the Horn-Schunk method, the Buxton-Buxton method, and the Black Jepson method, and discrete optimization methods, and the like.

The host device 120 may generate an optical field with optical flow vectors 510 associated with the image 500 according to subsequently captured frames of images including the image 500. For ease of understanding, the optical flow vectors 510 are depicted with the image 500 in FIG. 5. The optical flow vectors 510 correspond to sample points (or real-world objects) in the image 500, and indicate the magnitude and direction of velocity that are calculated by the host device 120 from each sample point.

As seen in the optical field of FIG. 5, the optical flow vectors 510 corresponding to sample points of the interior space 105 have magnitude that is small or nearly zero (depicted as dots), representing that the objects in the vehicle (i.e., the interior space 105) are substantially motionless. On the contrary, the optical flow vectors 510 corresponding to sample points of the captured external environment 107 extend out radially and have increasing magnitude, representing that the objects in the external environment 107 move relatively to the vehicle (i.e., the housing 103) at a certain rate of speed. Therefore, pixels of the image 500 corresponding to magnitude of velocity smaller than or equal to a velocity threshold value are classified into the first segment of FIG. 4A, while pixels of the image 500 corresponding to magnitude of velocity larger than the velocity threshold value are classified into the second segment of FIG. 4B. In some embodiment, the velocity threshold value may have a unit of pixel/ms, and may correspond to an actual moving speed of the object within the range of 0.1-0.5 km/h.

Figure 6:
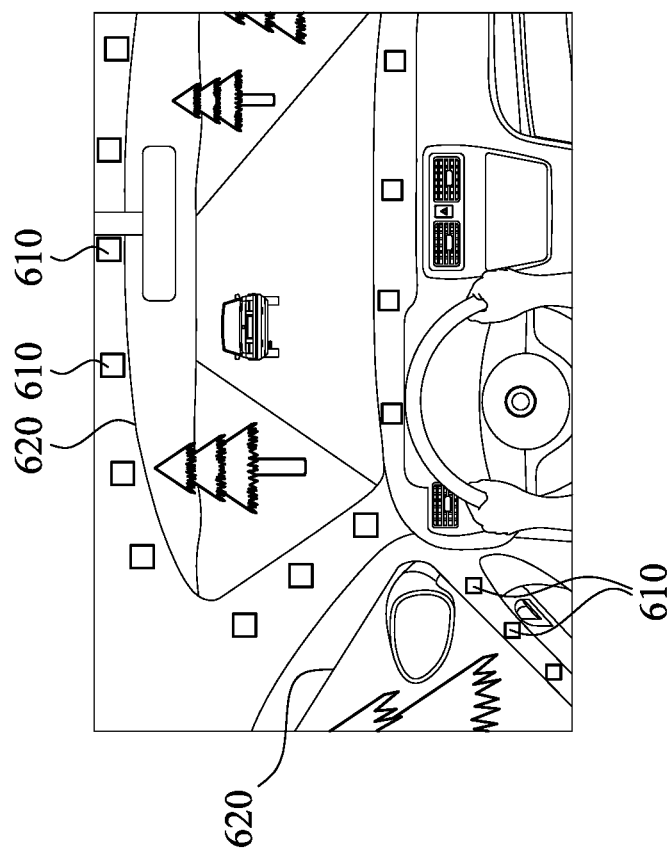
FIG. 6 depicts an image captured by the mobile device and used in the operation of FIG. 2, according to one embodiment of the present disclosure.

FIG. 6 depicts an image 600 captured by the mobile device 110 in step 210 and used for conducting step 220 of FIG. 2, according to one embodiment of the present disclosure. A plurality of landmarks 610 are implemented inside the housing 103 so as to indicate borders 620 of pixels corresponding to the interior space 105 with pixels corresponding to the captured external environment 107, and such landmarks 610 include, for example, stickers with QR code or specific pattern drawn nearby the borders 620, among others. The host device 120 may comprise an object detection model used to recognize the landmarks 610 so as to obtain the shape and distribution of the borders 620. The object segmentation model 123c classifies pixels of the image 600 surrounded by the borders 620 into the second segment of FIG. 4B, while the other pixels are classified into the first segment of FIG. 4A.

In some embodiments, there are one or more auxiliary parameters inputted to the object segmentation model 123c to assist the image segmentation. The auxiliary parameters may be generated by the mobile device 110 and include, for example, a velocity, an acceleration, an angular velocity, or an angular acceleration of the mobile device 110 at the time that the mobile device 110 captures a previous frame of image (e.g., an image that is one frame before the image 300, 500 or 600). Since the head of the user wearing the mobile device 110 usually has an continuous motion trace, by considering these auxiliary parameters regarding the previous frame, the object segmentation model 123c can better estimate the location of the portion corresponding to the captured external environment 107 (e.g., the location of the car screen) in the current frame. In this case, the mobile device 110 may include a three-axis accelerometer, a gyroscope and/or a GPS speed meter. The auxiliary parameters may also be obtained by the host device 120 by measuring parameters of the vehicle (e.g., the housing 103), such as the velocity of the vehicle and/or a steering angle.

Reference is made again to FIG. 2, after generating the first segment and second segment through techniques discussed above with respect to FIGS. 3-6, the host device 120 may conduct steps 230 and 240 to generate the first pose and the second pose, respectively. More particularly, the first segment associated with the interior space 105 is inputted to the first localization model 123a, so as to generate the first pose include a position and orientation described by the coordinate system of the interior space 105. The second segment associated with the captured external environment 107 is inputted to the second localization model 123b, so as to generate the second pose include a position and orientation described by the coordinate system of the external environment 107. The coordinate system of the interior space 105 is independent to that of the external environment 107 thereby the virtual objects provided by the mobile device 110 according to the first pose may move in a different way with the virtual objects provided according to the second pose, which is explained in the following with reference to FIGS. 7-8.

In some embodiments, there is an additional camera system (not shown) mounted on the housing 103, and such additional camera system is configured to capture images of the external environment 107 and may have higher performance (e.g., wider viewing angle, higher resolution or shorter shutter time) in comparison to the camera system 114 of the mobile device 110. The host device 120 applies feature mapping to the second segment and an image captured by the additional camera system (hereinafter referred to as the "additional image") so as to identified a portion of the additional image that correspond to the second segment but with higher image quality. Then, such portion of the additional image is inputted to the second localization model 123b to generate the second pose, instead of inputting the second segment to the second localization model 123b. Accordingly, the second pose generated by using the additional camera system may have higher accuracy due to the higher image quality of the additional image.

Figure 7:
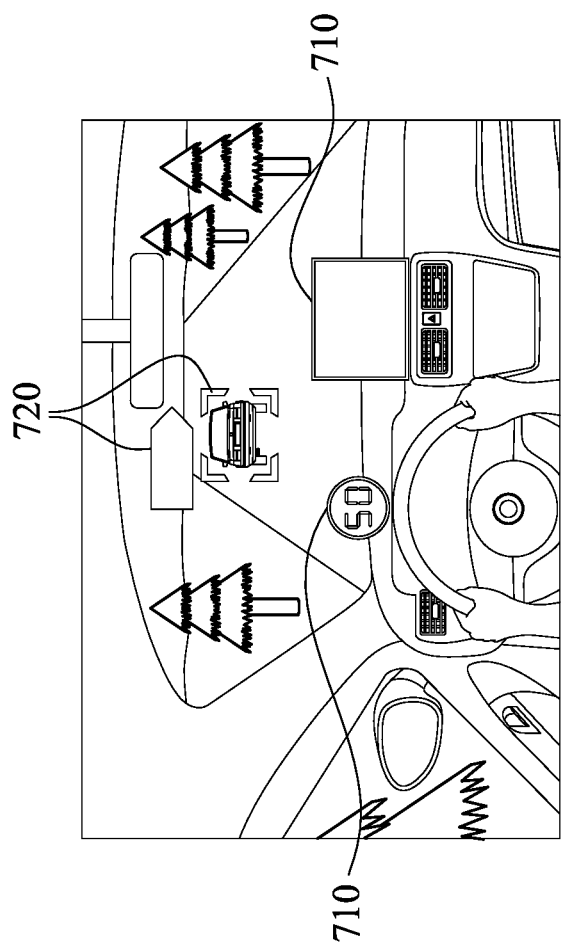
FIG. 7 is a schematic diagram of a virtual environment provided by the system of FIG. 1, according to one embodiment of the present disclosure.

In step 250 of FIG. 2, the host device 120 transmits the first pose and the second pose to the mobile device 110. FIG. 7 is a schematic diagram of a virtual environment provided by the system 100 of FIG. 1, according to one embodiment of the present disclosure. The mobile device 110 provides one or more first virtual objects 710 and one or more second virtual objects 720 to the user through the display system 115 according to the first pose and the second pose, respectively, and at the same time the user wearing the mobile device 110 may observe the real objects by direct viewing or through the display system 115 as discussed with respect to FIG. 1. Therefore, the first virtual objects 710 and the second virtual objects 720 appear to exist within the real-world environment. More particularly, the first virtual objects 710 (e.g., a virtual speedometer and a virtual display) provided according to the first pose appear to being placed on or attached to the real objects in the housing 103 (e.g., the components in the driver's seat). The first virtual objects 710 may be perceived by the user as relatively static to the interior space 105 or as moved with the real objects of the interior space 105 to which the first virtual objects 710 are attached. On the other hand, the second virtual objects 720 (e.g., a virtual road sign and a virtual square indicator) provided according to the second pose appear to being placed on or attached to the real objects in the external environment 107 (e.g., the other vehicle or street trees). The second virtual objects 720 may be perceived by the user as relatively static to the external environment 107 or as moved with the real objects of the external environment 107 to which the second virtual objects 720 are attached.

The interior space 105 and the external environment 107 have respective independent coordinate systems for describing the poses of the first virtual objects 710 and the second virtual objects 720, as discussed above with respect to FIG. 1. Therefore, a position and orientation of each first virtual object 710 is free from being affected by the change of the external environment 107, and a position and orientation of each second virtual object 720 is free from being affected by the change of the interior space 105, which is further explained with respect to FIG. 8.

Figure 8:
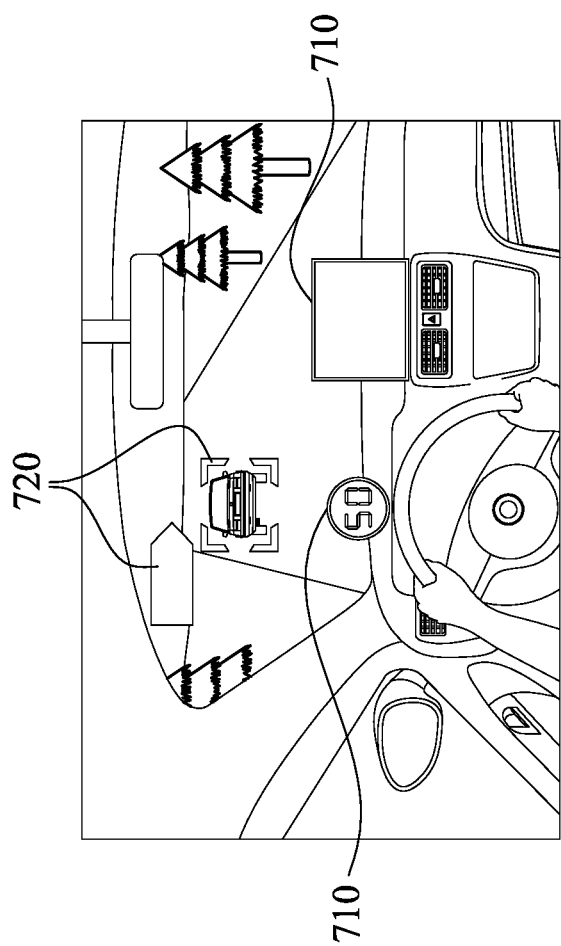
FIG. 8 is a schematic diagram of another virtual environment provided by the system of FIG. 1, according to one embodiment of the present disclosure.

In some embodiments, the virtual environment of FIG. 7 is updated to a new virtual environment of FIG. 8 when the user wearing the mobile device 110 controls the vehicle to take a right turn after the virtual environment of FIG. 7 is generated. Since the first virtual objects 710 and the second virtual objects 720 maintain static poses in their respective coordinate systems, the first virtual objects 710 remain in the same place in the field of view of the user (or of the mobile device 110) while the second virtual objects 720 move toward left of the field of view of the user (or of the mobile device 110). Accordingly, when the user changes the field of view of the mobile device 110 (e.g., by rotating his/her head), the poses of the first virtual objects 710 and the second virtual objects 720 are free from being affected by the change of the field of view, so that the first virtual objects 710 and the second virtual objects 720 appear to be really existed in the real-world environment.

Accordingly, in the system 100, the operation of tracking objects inside the vehicle is independent to that of tracking objects outside the vehicle. Therefore, the system 100 of FIG. 1 is applicable to perform inside out tracking inside a moving vehicle to achieve the self-positioning task without being affected by the difference of moving speed between the objects inside and outside the vehicle. As a result, the system 100 may keep virtual objects in correct positions in the real-world environment regardless of the field of view of the user wearing the mobile device 110.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A method for providing a virtual environment during movement, comprising:
   capturing a first image associated with an interior space of an at least partially enclosed housing and also associated with part of an external environment of the housing captured outward from the interior space;
   classifying the first image into a first segment associated with the interior space and a second segment associated with the part of the external environment captured from the interior space;
   estimating a first pose and a second pose of a mobile device associated with respective the housing and the external environment, wherein the first pose is estimated by a first localization model based on the first segment, and the second pose is estimated by a second localization model based on a second image associated with the external environment; and
   displaying a plurality of virtual objects in a field of view of the mobile device according to the first pose and the second pose.

2. The method of claim 1, wherein classifying the first image into the first segment and the second segment comprises:
   selecting a subset of depth threshold values corresponding to different portions of a map of the interior space, respectively,
   wherein among pixels of the first image corresponding to each portion of the map, pixels corresponding to depth values smaller than or equal to a corresponding depth threshold value of the subset of threshold values are classified into the first segment, and pixels corresponding to depth values larger than the corresponding depth threshold value are classified into the second segment,
   wherein the second image comprises the second segment.

3. The method of claim 2, wherein the first image is captured by a camera system of the mobile device, and depth values associated with the first image are captured by a depth sensor of the mobile device.

4. The method of claim 1, wherein classifying the first image into the first segment and the second segment comprises:
   classifying pixels in the first image corresponding to depth values smaller than or equal to a depth threshold value into the first segment; and
   classifying pixels in the first image corresponding to depth values larger than the depth threshold value into the second segment,
   wherein the second image comprises the second segment.

5. The method of claim 1, wherein classifying the first image into the first segment and the second segment comprises:
   classifying pixels in the first image corresponding to magnitude of velocity, calculated through an optical flow algorithm and smaller than or equal to a velocity threshold value, into the first segment; and
   classifying pixels in the first image corresponding to magnitude of velocity, calculated through the optical flow algorithm and larger than the velocity threshold value, into the second segment.

6. The method of claim 1, wherein classifying the first image into the first segment and the second segment comprises recognizing landmarks in the first image indicating borders of pixels corresponding to the interior space with pixels corresponding to the part of the external environment captured outward from the interior space, and the second image comprises the second segment.

7. The method of claim 1, wherein the first image is captured by a camera system of the mobile device, and the second image is captured by an additional camera system mounted on the housing configured to capture images of the external environment.

8. The method of claim 1, wherein the housing includes a shell of a vehicle, and classifying the first image into the first segment and the second segment comprises:
   obtaining a velocity or a steering angle of the vehicle; and
   classifying the first image into the first segment and the second segment according to the velocity or the steering angle of the vehicle.

9. The method of claim 1, wherein classifying the first image into the first segment and the second segment comprises:
   obtaining a velocity, an acceleration, an angular velocity, or an angular acceleration of the mobile device when capturing a third image which is a previous frame of the first image; and classifying the first image into the first segment and the second segment according to the velocity, the acceleration, the angular velocity, or the angular acceleration of the mobile device.

10. A system for providing a virtual environment during movement, comprising:
a mobile device, configured to capture a first image associated with an interior space of an at least partially enclosed housing and also associated with part of an external environment of the housing captured outward from the interior space; and
a host device, communicatively coupled with the mobile device, and configured to:
classify the first image into a first segment associated with the interior space and a second segment associated with the part of the external environment captured from the interior space; and
estimate a first pose and a second pose of the mobile device associated with respective the housing and the external environment, wherein the first pose is estimated by a first localization model based on the first segment, and the second pose is estimated by a second localization model based on a second image associated with the external environment,
wherein the mobile device is further configured to display a plurality of virtual objects in a field of view of the mobile device according to the first pose and the second pose.

11. The system of claim 10, wherein when the host device classifies the first image into the first segment and the second segment, the host device is further configured to:
select a subset of depth threshold values corresponding to different portions of a map of the interior space, respectively,
wherein among pixels of the first image corresponding to each portion of the map, pixels corresponding to depth values smaller than or equal to a corresponding depth threshold value of the subset of threshold values are classified into the first segment, and pixels corresponding to depth values larger than the corresponding depth threshold value are classified into the second segment,
wherein the second image comprises the second segment.

12. The system of claim 11, wherein the first image is captured by a camera system of the mobile device, and depth values associated with the first image are captured by a depth sensor of the mobile device.

13. The system of claim 10, wherein when the host device classifies the first image into the first segment and the second segment, the host device is configured to:
classify pixels in the first image corresponding to depth values smaller than or equal to a depth threshold value into the first segment; and
classify pixels in the first image corresponding to depth values larger than the depth threshold value into the second segment,
wherein the second image comprises the second segment.

14. The system of claim 10, wherein when the host device classifies the first image into the first segment and the second segment, the host device is configured to:
classify pixels in the first image corresponding to magnitude of velocity, calculated through an optical flow algorithm and smaller than or equal to a velocity threshold value, into the first segment; and
classify pixels in the first image corresponding to magnitude of velocity, calculated through the optical flow algorithm and larger than the velocity threshold value, into the second segment.

15. The system of claim 10, wherein when the host device classifies the first image into the first segment and the second segment, the host device is configured to recognize landmarks in the first image indicating borders of pixels corresponding the interior space with pixels corresponding to the part of the external environment captured outward from the interior space, wherein the second image comprises the second segment.

16. The system of claim 10, wherein the first image is captured by a camera system of the mobile device, and the second image is captured by an additional camera system mounted on the housing configured to capture images of the external environment.

17. The system of claim 10, wherein the housing includes a shell of a vehicle, and when the host device classifies the first image into the first segment and the second segment, the host device is configured to:
obtain a velocity or a steering angle of the vehicle; and
classify the first image into the first segment and the second segment according to the velocity or the steering angle of the vehicle.

18. The system of claim 10, wherein when the host device classifies the first image into the first segment and the second segment, the host device is configured to:
obtain a velocity, an acceleration, an angular velocity, or an angular acceleration of the mobile device when capturing a third image which is a previous frame of the first image; and
classify the first image into the first segment and the second segment according to the velocity, the acceleration, the angular velocity, or the angular acceleration of the mobile device.

19. A non-transitory computer-readable storage medium storing a plurality of computer-readable instructions for controlling a system for providing a virtual environment during movement, the plurality of computer-readable instructions, when being executed by the system, causing the system to perform:
capturing a first image associated with an interior space of an at least partially enclosed housing and also associated with part of an external environment of the housing captured outward from the interior space;
classifying the first image into a first segment associated with the interior space and a second segment associated with the part of the external environment captured from the interior space;
estimating a first pose and a second pose of a mobile device associated with respective the housing and the external environment, wherein the first pose is estimated by a first localization model based on the first segment, and the second pose is estimated by a second localization model based on a second image associated with the external environment; and
displaying a plurality of virtual objects in a field of view of the mobile device according to the first pose and the second pose.

20. The non-transitory computer-readable storage medium of claim 19, wherein classifying the first image into the first segment and the second segment comprises:
selecting a subset of depth threshold values corresponding to different portions of a map of the interior space, respectively,
wherein among pixels of the first image corresponding to each portion of the map, pixels corresponding to depth values smaller than or equal to a corresponding depth threshold value of the subset of threshold values are classified into the first segment, and pixels corresponding to depth values larger than the corresponding depth threshold value are classified into the second segment, wherein the second image comprises the second segment.

\* \* \* \* \*